(12) United States Patent
Xu et al.

(10) Patent No.: US 9,844,923 B2
(45) Date of Patent: Dec. 19, 2017

(54) CORROSION AND WEAR RESISTANT COATING ON ZIRCONIUM ALLOY CLADDING

(71) Applicant: WESTINGHOUSE ELECTRIC COMPANY LLC, Cranberry Township, PA (US)

(72) Inventors: Peng Xu, Columbia, SC (US); Lu Cai, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 489 days.

(21) Appl. No.: 14/826,524

(22) Filed: Aug. 14, 2015

(65) Prior Publication Data
US 2017/0043555 A1 Feb. 16, 2017

(51) Int. Cl.
| | |
|---|---|
| *B32B 15/00* | (2006.01) |
| *B32B 15/01* | (2006.01) |
| *G21C 3/07* | (2006.01) |
| *G21C 3/20* | (2006.01) |
| *G21C 17/022* | (2006.01) |

(52) U.S. Cl.
CPC ............. *B32B 15/01* (2013.01); *G21C 3/07* (2013.01); *G21C 3/20* (2013.01); *G21C 17/0225* (2013.01); *Y02E 30/40* (2013.01)

(58) Field of Classification Search
CPC ...... B32B 15/01; G21C 3/07; G21Y 2004/10; G21Y 2004/202
USPC ......................................................... 428/641
See application file for complete search history.

(56) References Cited

U.S. PATENT DOCUMENTS

| | | | |
|---|---|---|---|
| 5,364,659 A | 11/1994 | Rapp et al. | |
| 5,589,220 A | 12/1996 | Rapp et al. | |
| 6,620,518 B2 | 9/2003 | Lavery et al. | |
| 7,645,485 B2 | 1/2010 | Madhava | |
| 8,202,629 B2 | 6/2012 | Heinzel et al. | |
| 8,792,607 B2 | 7/2014 | Kim et al. | |
| 2013/0251087 A1 | 9/2013 | Short | |
| 2013/0344348 A1* | 12/2013 | Koo ..................... | B23K 26/32 |
| | | | 428/553 |

FOREIGN PATENT DOCUMENTS

| | | |
|---|---|---|
| EP | 2178092 A2 | 4/2010 |
| JP | 07-027884 A | 1/1995 |
| JP | 07-248391 A | 9/1995 |

OTHER PUBLICATIONS

International Searching Authority, International Search Report and the Written Opinion for International Application No. PCT/US2016/045081, dated Dec. 8, 2016.

* cited by examiner

*Primary Examiner* — Hui Chin
(74) *Attorney, Agent, or Firm* — Joseph C. Spadacene; Westinghouse Electric Company LLC

(57) ABSTRACT

The invention relates to compositions and methods for coating a zirconium alloy cladding of a fuel element for a nuclear water reactor. The composition includes a master alloy including one or more alloying elements selected from chromium, silicon and aluminum, a chemical activator and an inert filler. The alloying element(s) is deposited or are co-deposited on the cladding using a pack cementation process. When the coated zirconium alloy cladding is exposed to and contacted with water in a nuclear reactor, a protective oxide layer can form on the coated surface of the cladding.

10 Claims, 3 Drawing Sheets

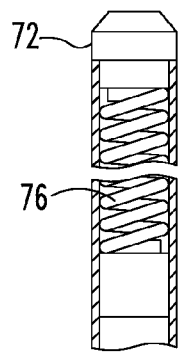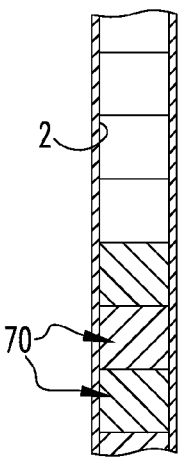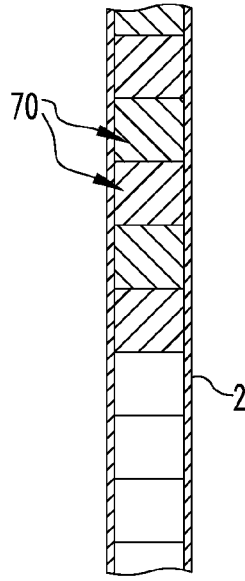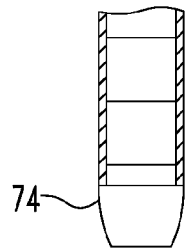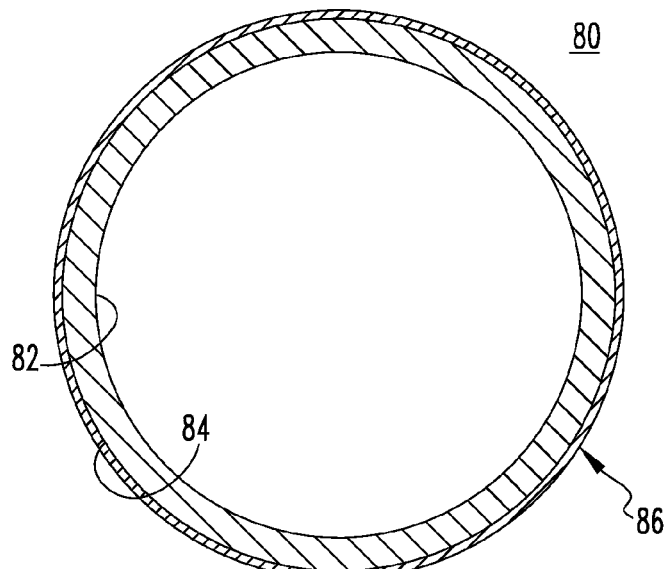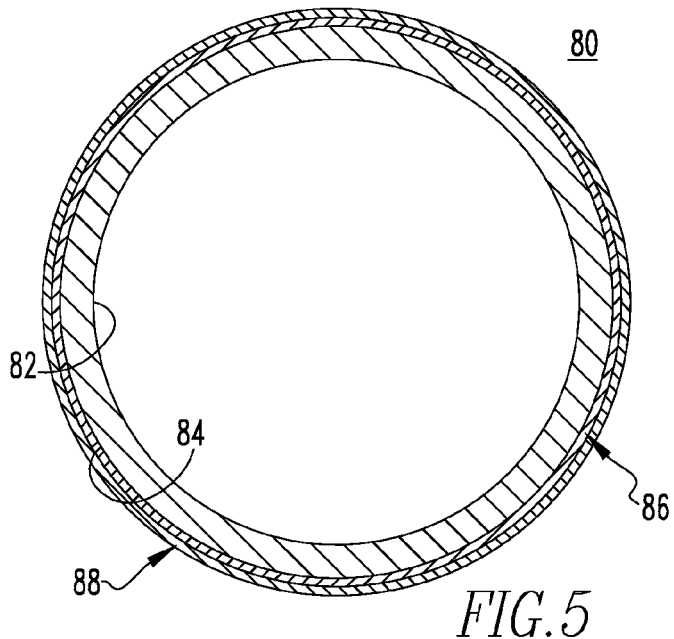
FIG. 3 (PRIOR ART)
FIG. 4
FIG. 5

CORROSION AND WEAR RESISTANT COATING ON ZIRCONIUM ALLOY CLADDING

BACKGROUND

1. Field

The invention relates to compositions and methods for coating zirconium alloy cladding to enhance corrosion resistance and water resistance under nuclear reactor accident conditions and during normal operation.

2. Description of Related Art

In a typical commercial nuclear water reactor, such as a pressurized water reactor (PWR), heavy water reactor (e.g., a CANDU) or a boiling water reactor (BWR), the reactor core includes a large number of fuel assemblies, each of which is composed of a plurality, e.g., bundles or assemblies, of elongated fuel elements or fuel rods. Fuel assemblies vary in size and design depending on the desired size of the reactor and the core.

The fuel rods each contain nuclear fuel fissile material, such as, at least one of uranium dioxide ($UO_2$), plutonium dioxide ($PuO_2$), thorium dioxide ($ThO_2$), uranium nitride (UN) and uranium silicide ($U_3Si_2$), and mixtures thereof. At least a portion of the fuel rods can also include neutron absorbing material, such as, boron or boron compounds, gadolinium or gadolinium compounds, erbium or erbium compounds and the like. The neutron absorbing material may be present on or in pellets in the form of a stack of nuclear fuel pellets. Annular or particle forms of fuel also can be used.

The fuel is encased in a sealed tube, commonly referred to as fuel cladding. Each of the fuel rods has cladding that acts as containment to hold the fissile material. The fuel rods are grouped together in an array which is organized to provide a neutron flux in the reactor core sufficient to support a high rate of nuclear fission and thus, the release of a large amount of energy in the form of heat. The cladding maintains the fuel in a position for which controlled fission can proceed and generate heat. A coolant, such as water, is pumped through the reactor core to extract the heat generated in the reactor core for the production of useful work such as electricity. The cladding then transfers the heat from the fuel to pressurized water that circulates around the primary loop of the reactor coolant system. The heated water in the primary loop is used to boil water in a steam generator and the steam is then expanded in a turbine that powers an electrical generator. Alternatively, the water circulating through the reactor may be allowed to boil to generate steam directly, which is then expanded in a turbine.

In a typical commercial nuclear reactor, the fuel assemblies in the core each have top and bottom nozzles. A plurality of elongated transversely spaced guide thimbles extends longitudinally between the nozzles. The plurality of elongated fuel elements or rods which compose the fuel assemblies are transversely spaced apart from one another and the guide thimbles. A plurality of transverse support grids are axially spaced along and attached to the guide thimbles. The grids are used to precisely maintain the spacing and support between the fuel rods in the reactor core, provide lateral support for the fuel rods, and induce mixing of the coolant.

FIG. 1 shows an exemplary reactor pressure vessel 10 and nuclear core 14. The nuclear core 14 includes a plurality of parallel, vertical, co-extending fuel assemblies 22. For purpose of this description, the other vessel internal structures can be divided into lower internals 24 and upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 1), and support and guide instrumentation and components, such as control rods 28. In the exemplary reactor shown in FIG. 1, coolant enters the reactor pressure vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, a lower core support plate having the same elevation as 37. The coolant flow through the core and surrounding area 38 is typically large, on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the nuclear core 14 flows along the underside of the upper core plate 40 and upwardly through a plurality of perforations 42. The coolant then flows upwardly and radially outward to one or more outlet nozzles 44.

One of the exemplary fuel assemblies 22 of FIG. 1 is shown in more detail in FIG. 2. As shown in FIG. 2, each of the fuel assemblies 22 includes radially-extending flukes or arms 52 and fuel rods 66 grouped in an array thereof. The fuel rods 66 are held in spaced relationship with one another by the grids 64 spaced along the fuel assembly length. At its lower end, a bottom nozzle 58 supports each of the fuel assemblies 22 on the lower core plate 36. At its upper end, each of the fuel assemblies 22 includes a top nozzle 62. An instrumentation tube 68 is located in the center and extends between and is mounted to the bottom and top nozzles 58 and 62, respectively. Each of the fuel rods 66 includes a plurality of nuclear fuel pellets 70 and is closed at its opposite ends by upper and lower end plugs 72 and 74, respectively. The pellets 70 are maintained in a stack by a plenum spring 76 disposed between the upper end plugs 72 and the top of the pellet stack. The fuel pellets 70, composed of fissile material, are responsible for creating the reactive power of the reactor.

One of the exemplary fuel rods 66 of FIG. 2 is shown in more detail in FIG. 3. As shown in FIG. 3, each of the fuel rods 66 includes a stack of the plurality of nuclear fuel pellets 70, the upper and lower end plugs 72 and 74, respectively, and the spring 76 which serves as a hold-down device to maintain the stacked configuration of the pellets 70. In addition, FIG. 3 shows the fuel rod cladding 2 which surrounds the pellets 70 to function as a barrier to prevent the fission by-products from entering the coolant and further contaminating the reactor system. The cladding 2 is typically in the shape of an elongated tube having a cavity formed therein and two opposing open ends. The upper and lower end plugs 72 and 74, respectively, provide a seal and prevent reactor coolant that is circulating in the core from entering the cavity of the fuel rod cladding 2. The thickness of the tube wall can vary. In certain embodiments, the tube wall thickness is from about 100 to about 1000 microns or from about 200 to 400 microns. The cladding may be composed of a zirconium (Zr)-based alloy. The cladding may include Zr and as much as about two percent by weight of other metals, such as niobium (Nb), tin (Sn), iron (Fe), chromium (Cr) and combinations thereof.

It is known in the art that there are various concerns relating to nuclear fuel rod cladding, including embrittlement of the cladding material during normal plant operation, which can lower the safety margin and potentially lead to failure under accident conditions, rapid corrosion of the Zr alloy tube at elevated temperatures associated with an accident scenario. In the event of an accident such as a Loss of Coolant Accident, temperatures inside the reactor core can exceed 1200° C. At very high temperatures, Zr rapidly oxidizes in the presence of steam which causes degradation of the fuel rods and production of large amounts of hydrogen which can lead to chemical explosions.

Surface-modification of the cladding is generally considered to improve corrosion resistance. Applying an oxidation-resistant coating to the outside surface of the cladding can at least reduce water corrosion and wear during normal plant operation, and potentially avoid potential negative consequences associated with Zr oxidation and fuel rod degradation in an accident scenario.

The coating can be applied on the fuel cladding using conventional coating methods, such as, but not limited to cold spraying and thermal spraying.

Cold spraying techniques generally include powder particles (e.g., the coating mixture including the master alloy, chemical activator and inert filler), typically, from about 10 to 50 µm, accelerated to very high velocities, typically, from 200 to 1000 m/s, by a compressed gas jet at temperatures well below their melting points. Upon impact with the substrate, the particles experience extreme and rapid deformation. This allows contact between the Zr alloy cladding surface under high local pressure, permitting bonding to occur and thick layers of deposited master alloy element(s) to build-up rapidly.

Thermal spraying techniques generally include thermal energy to melt or soften the coating mixture including the master alloy, chemical activator and inert filler under an inert atmosphere or a vacuum, causing the element(s) of the master alloy to adhere to the cladding surface and each other to form a coating. Thermal spray guns can be used to achieve the high velocity spraying.

It is an object of this invention to provide compositions and methods for coating a Zr alloy nuclear fuel cladding employing chromium, silicon, aluminum or mixtures thereof. The coating can be applied to an exterior surface of the fuel cladding, an interior surface of the fuel cladding, or both the exterior and the interior surfaces. The coating protects the exterior and/or interior surface(s) of the fuel cladding from one or more of oxidation, hydrogen uptake and wear failures. The coating is applied using a pack cementation method, which is traditionally employed in gas turbine and aircraft engine applications. Thicker coatings may be applied to Zr alloy tubes of greater thickness and then subjected to conventional cold work methods to reduce the thickness of both the coating and cladding. Thickness reduction may be achieved in several steps and heat treatment may be used between these steps to release residual stress in the material and to improve ductility.

SUMMARY OF THE INVENTION

In one aspect, the invention provides a method of coating a zirconium alloy substrate for use in a nuclear water reactor. The method includes obtaining the zirconium alloy substrate having a surface, combining a master alloy including one or more elements selected from the group consisting of chromium, silicon and aluminum, a chemical activator and an inert filler powder to form a coating mixture, obtaining a chamber having a heating zone and an inert or reducing gas atmosphere, surrounding the zirconium alloy substrate with the coating mixture in the chamber, heating the chamber to an elevated temperature, reacting the master alloy with the chemical activator to form a gaseous compound, diffusing the gaseous compound to contact the surface of the zirconium alloy substrate, diffusing the gaseous compound to contact the surface of the zirconium alloy substrate, depositing the one or more elements of the master alloy on the surface of the zirconium alloy substrate, and forming a substantially uniform diffusion coating layer thereon comprising zirconium and the one or more elements of the master alloy.

In certain embodiments, surrounding includes packing the zirconium alloy substrate in a bed of the coating mixture.

The coating layer may be formed on one or both of an interior surface and an exterior surface of the zirconium alloy substrate.

The method can further include positioning the zirconium alloy substrate with the substantially uniform diffusion coating layer thereon in a nuclear reactor, exposing and contacting with water the zirconium alloy substrate with the substantially uniform diffusion coating layer thereon, and forming a protective oxide layer on the substantially uniform diffusion coating layer, which includes one or more of the following: $Cr_2O_3$, $SiO_2$ and $Al_2O_3$ when the one or more elements of the master alloy is chromium, silicon and aluminum, respectively.

In certain embodiments, the diffusion coating layer includes Zr—Cr alloy, Zr—Si alloy and Zr—Al alloy when the one or more elements of the master alloy is chromium, silicon and aluminum, respectively. Further, the Zr—Cr alloy, Zr—Si alloy and Zr—Al alloy can be $ZrCr_2$, $ZrSi_2$ and $ZrAl_3$, respectively.

The substrate can be a fuel element for a nuclear water reactor. In certain embodiments, the substrate is a fuel rod cladding.

The master alloy can be in the form of a powder.

In certain embodiments, the heating is conducted at a temperature from 600° C. to 1100° C.

The cladding can have a thickness from 1 micron to 200 microns.

In certain embodiments, the coated zirconium alloy tube is subjected to one or more cold working steps to reduce the overall thickness and achieve a final dimension. The cold working can include pilgering. Further, intermediate annealing of the coated zirconium alloy substrate can be conducted to release residual stress in the coating and cladding.

In another aspect, the invention provides a method of forming an oxide layer on a zirconium alloy substrate for use in a nuclear water reactor. The method includes obtaining the zirconium alloy substrate having a surface, combining a master alloy including one or more elements selected from the group consisting of chromium, silicon and aluminum, a chemical activator and an inert filler powder to form a coating mixture, applying the coating mixture to the zirconium alloy substrate; reacting the master alloy with the chemical activator to form a bond, depositing the one or more elements of the master alloy on the surface of the zirconium alloy substrate, forming a substantially uniform diffusion coating layer thereon, positioning the diffusion coated zirconium alloy substrate in a nuclear reactor, exposing and contacting the diffusion coated zirconium alloy substrate with water, and forming on the diffusion coating layer an oxide layer.

In yet another aspect, the invention provides a coated composite including a zirconium alloy substrate and a coating composition, which includes a master alloy including alloying elements selected from the group consisting of chromium, silicon, mixtures of chromium and silicon, mixtures of chromium and aluminum, and mixtures of silicon and aluminum; chemical activator and inert filler powder. Wherein, the coating composition is deposited on the zirconium alloy substrate to form a substantially uniform coating layer, which includes one or more of Zr—Cr alloy, Zr—Si alloy and Zr—Al alloy when the one or more elements of the master alloy is chromium, silicon and aluminum, respectively. Further, the Zr—Cr alloy, Zr—Si alloy and Zr—Al alloy can be $ZrCr_2$, $ZrSi_2$ and $ZrAl_3$, respectively.

BRIEF DESCRIPTION OF THE DRAWINGS

A further understanding of the invention can be gained from the following description of the preferred embodiments when read in conjunction with the accompanying drawings in which:

FIG. 3 is a cross-section view, partially in section of a fuel rod, in accordance with the prior art;

FIG. 4 is a cross-sectional view of a fuel rod cladding having a coating deposited on an exterior surface, in accordance with certain embodiments of the invention; and FIG. 5 is a cross-sectional view of the coated fuel rod cladding shown in FIG. 4 and as a result of being exposed to water, having a second layer, i.e., protective oxide layer, formed on a first layer, in accordance with certain embodiments of the invention.

DESCRIPTION OF THE PREFERRED EMBODIMENT

Figure 1:
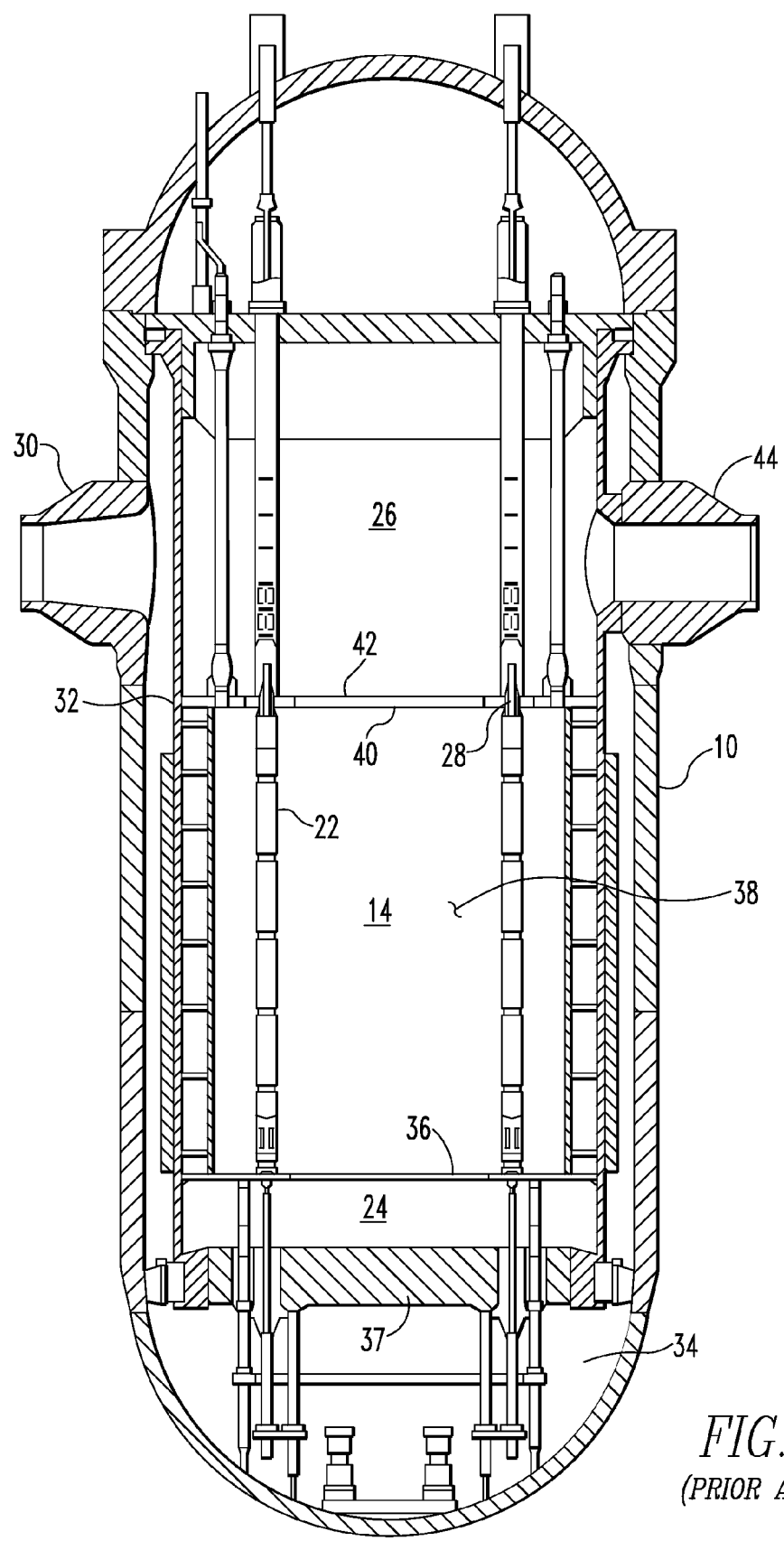
FIG. 1 is an elevational view, partially in section of a nuclear reactor vessel and internal components, in accordance with the prior art.
Figure 2:
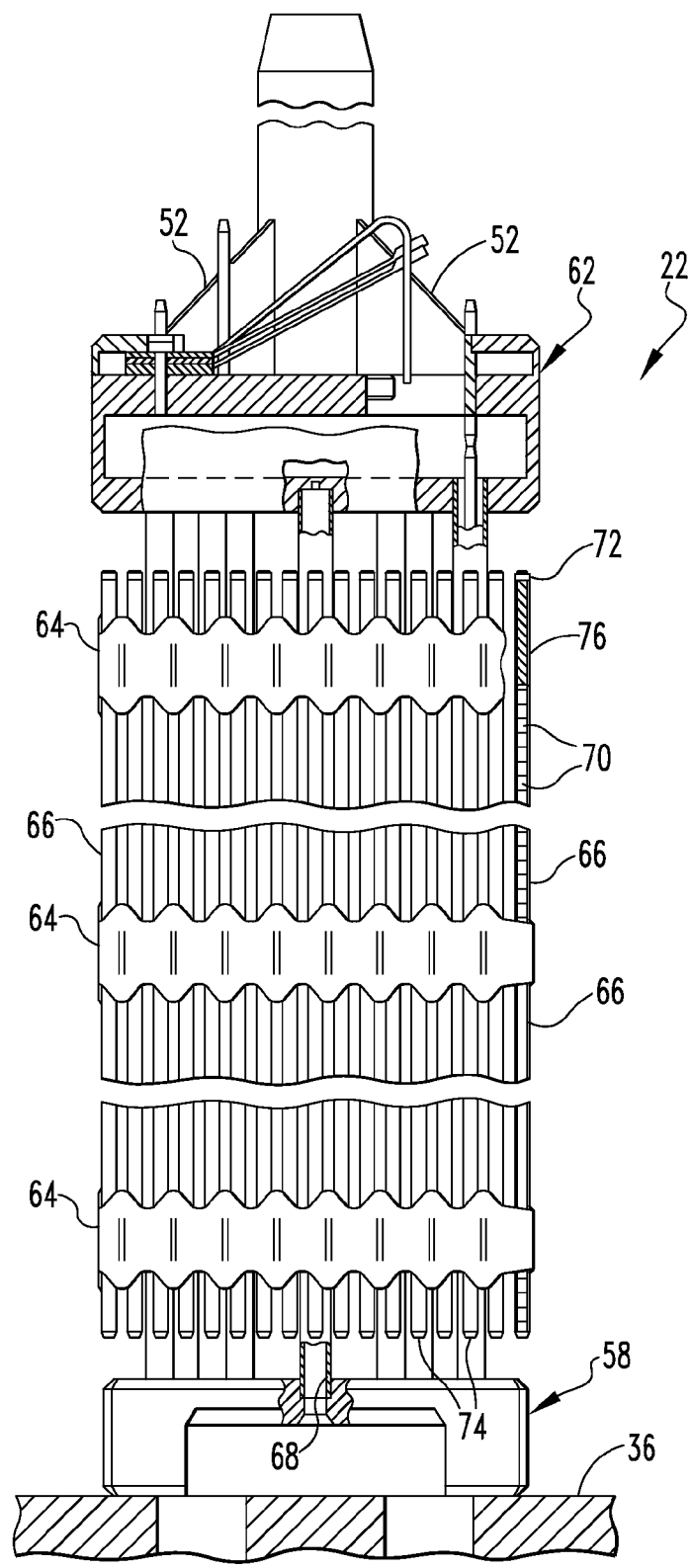
FIG. 2 is an elevational view, partially in section of a fuel assembly illustrated as shown in FIG. 1 in vertically shortened form, with parts broken away for clarity, in accordance with the prior art.

The invention relates generally to fuel rod elements for use in nuclear water reactors, such as pressurized water reactors and boiling water reactors. The fuel rod elements include cladding. The cladding may be composed and constructed of a variety of conventional materials known in the art. For example, as previously described herein, it is known to construct fuel rod cladding for a nuclear water reactor from zirconium (Zr) alloy containing a majority amount of Zr and a minority amount, e.g., up to about 2% by weight based on total weight of the composition, of other metals, such as but not limited to niobium (Nb), tin (Sn), iron (Fe), chromium (Cr) and combinations thereof. Non-limiting examples of conventional Zr alloys for use in a nuclear water reactor include, but are not limited to, Zircaloy-2, Zircaloy-4, and ZIRLO.

The fuel rod cladding is positioned in the core of a nuclear water reactor and therefore, is in contact and reacts with water to produce hydrogen according to the following reaction:

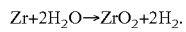

Without intending to be bound by any particular theory, it is believed that as oxidation proceeds, hydrogen enters the cladding surface and precipitates as zirconium hydride. The formation of an external oxide layer and hydride precipitators cause embrittlement of the cladding, which lowers the safety margin and may potentially lead to failure under accident conditions. Furthermore, in accordance with the invention, it is believed that application of a coating to the surface of the cladding can significantly reduce hydrogen uptake and therefore, improve reliability and safety margins.

The invention includes applying to, e.g., depositing on, the cladding surface a substantially uniform coating layer. Further, the invention includes depositing, e.g., co-depositing, onto the cladding surface one or more alloying elements including chromium, silicon, aluminum and mixtures thereof, which can be in elemental form or alloy form. In certain embodiments, the coating can be applied to either the interior surface or exterior surface of the cladding and in other embodiments, the coating can be applied to both the interior and exterior surfaces of the cladding. The coating can be applied using a variety of methods. The coating is effective to at least reduce or prevent waterside corrosion and wear of the cladding.

In accordance with the invention, a coating mixture is formed by combining a master alloy, a chemical activator and an inert filler powder. The master alloy is selected based on the elements that are desired to be deposited, e.g., co-deposited, on the cladding surface. The master alloy includes one or more of chromium, silicon and aluminum. In certain embodiments, the master alloy includes chromium or silicon or a mixture of chromium and silicon, or a mixture of chromium and aluminum, or a mixture of silicon and aluminum. Suitable chemical activators for use in the invention include those that are generally known in the art. In certain embodiments, salt activator, such as, halide salt activator, is used. Non-limiting examples of suitable halide salt activators include, but are not limited to, NaF, NaCl, $NH_4Cl$, $NH_4F$, as well as dual activators, such as, NaF/NaCl, and mixtures thereof. A variety of inert filler powders are also generally known in the art and they are suitable inert filler powders for use in the invention. Non-limiting examples include, but are not limited to, $Al_2O_3$, $SiO_2$ and mixtures thereof.

The coating layer can be applied to the Zr alloy surface by employing conventional methods and apparatus known in the art. Alternatively, in accordance with the invention, a pack cementation method can be employed for applying the coating to the Zr alloy cladding surface for use in a light water nuclear reactor. Traditionally, the pack cementation method is employed for coating various alloys used in gas turbines and fossil fuel burning power plants. An advantage of employing the pack cementation process is the uniformity of the resulting coating. Such uniformity can be accomplished even on complex shapes and configurations.

In accordance with the invention, the coating is applied on zirconium tubes of various thickness and in certain embodiments, the thickness varies from 1 micron to 200 microns. For example, the coating can be applied to thicker zirconium tubes, e.g., called TREX (Tube Reduced Extrusion). The dimension of the TREX is typically 2.5" OD×1.64" ID (0.43" wall) and the length can be as long as 12 feet. The coated tube or TREX may be subjected to cold work to reduce the overall thickness of the tube and to achieve the final dimension. Intermediate annealing may be used to release residual stress in the coating and zirconium tubes. In certain embodiments, the coated Zr alloy cladding can be subjected to cold work using conventional methods, such as, but not limited to, pilgering, to reduce the overall thickness of the coating and/or cladding. Multiple cold work steps may be conducted to achieve a final, e.g., desired, dimension of the cladding.

The pack cementation process is a batch vapor deposition process that includes simultaneous heat treatment. The entire cladding surface or select portions of the cladding surface can be coated. The cladding surface or the portions of the cladding surface that are to be coated are surrounded, e.g., packed, in the coating mixture. For example, in certain embodiments, the coating mixture forms a powder bed composition and the cladding or portions thereof are packed, e.g., buried, within the bed. The powder bed composition is formed by thoroughly mixing together the master alloy, chemical activator and inert filler components of the chemical mixture. The master alloy and inert filler components are typically provided in dry form, e.g., a powder.

The cladding is placed and sealed in a chamber, e.g., retort or furnace, surrounded by the pack. The chamber has a heating zone and an inert atmosphere. The chamber is heated to an elevated temperature. The temperature in the chamber can vary and may depend on the components selected for the coating mixture. In certain embodiments, the chamber temperature can be in a range from 600° C. to 1100° C. The temperature is maintained within this range for a period of time that is sufficient to deposit a coating on the surface of the cladding. In general, the chamber temperature is selected such that it is sufficiently high for the master alloy to react with the chemical activator to form a gaseous compound. The gaseous compound serves as a transfer medium that carries the master alloy to the cladding surface. The gaseous compound contacts the cladding surface and decomposes at the surface to deposit or co-deposit the master alloy element (s), e.g., one or more of chromium, silicon and aluminum, on the surface of the cladding. As a result, a diffusion coating layer is formed thereon. The chemical activator is released, returned to the pack, e.g., powder bed composition, and continues to react with the master alloy. The transfer process continues until the master alloy in the pack is depleted, e.g., used, or the temperature in the chamber is decreased, e.g., cooled.

The diffusion coating layer consists of a phase that includes elements of the cladding material, e.g., zirconium (Zr), and elements deposited from the master alloy. In certain embodiments, wherein the cladding material is zirconium alloy and the master alloy deposited is chromium, the diffusion coating layer includes a Zr—Cr phase or alloy having elements of zirconium and chromium, such as, but not limited to, $ZrCr_2$. Similarly, for a zirconium alloy cladding and silicon master alloy, the diffusion coating layer includes a Zr—Si phase or alloy having elements of zirconium and silicon, such as, but not limited to, $ZrSi_2$ and, for a zirconium alloy cladding and an aluminum master alloy, the diffusion coating layer includes a Zr—Al phase or alloy having elements of zirconium and aluminum, such as, but not limited to $ZrAl_3$.

FIG. 4 is a schematic showing a coated cladding tube that illustrates a diffusion coating layer applied to an exterior surface of the cladding tube. FIG. 4 shows a coated cladding 80 having an interior surface 82 and an exterior surface 84. The exterior surface 84 has deposited thereon a diffusion coating 86.

In certain embodiments, an additional heat treatment may be performed to convert the diffusion layer into a coating having improved rigidity.

The cladding having deposited thereon the diffusion coating layer is installed in a nuclear reactor core during plant operation. As the coated cladding is exposed to and contacted with water, a protective oxide layer is formed. Wherein the element deposited in the diffusion coating layer is chromium, the oxide layer includes $Cr_2O_3$, wherein the master alloy element deposited in the diffusion coating layer is silicon, the oxide layer includes $SiO_2$, and wherein the master alloy element deposited is aluminum, the oxide layer includes $Al_2O_3$.

FIG. 5 is a schematic showing a coated cladding tube that illustrates a protective oxide layer coating applied to an exterior surface of a coated cladding tube. FIG. 5 shows the coated cladding 80, the interior surface 82, the exterior surface 84 and the diffusion coating 86, as shown in FIG. 4. In addition, FIG. 5 includes a protective oxide layer 88 formed on the diffusion coating 86. The protective oxide layer 88 is effective to at least reduce or preclude hydrogen diffusion. The diffusion coating 86, that is underlying the protective oxide layer 88, provides an additional barrier to hydrogen diffusion. Thus, the diffusion coating 86 and the protective oxide layer 88 cause oxidation and hydrogen uptake in the cladding material, e.g., Zr, to be at least reduced or precluded.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of coating a zirconium alloy substrate for use in a nuclear water reactor, comprising:
    obtaining the zirconium alloy substrate having a surface;
    combining a master alloy comprising one or more elements selected from the group consisting of chromium, silicon and aluminum, a chemical activator and an inert filler powder to form a coating mixture;
    obtaining a chamber having a heating zone and an inert or reducing gas atmosphere;
    surrounding the zirconium alloy substrate with the coating mixture in the chamber;
    heating the chamber to an elevated temperature;
    reacting the master alloy with the chemical activator to form a gaseous compound;
    diffusing the gaseous compound to contact the surface of the zirconium alloy substrate;
    decomposing the gaseous compound;
    depositing the one or more elements of the master alloy on the surface of the zirconium alloy substrate; and
    forming a substantially uniform diffusion coating layer thereon comprising zirconium and the one or more elements of the master alloy.

2. The method of claim 1, wherein the surrounding includes packing the zirconium alloy substrate in a bed of the coating mixture.

3. The method of claim 1, wherein the diffusion coating layer is formed on one or both of an interior surface and an exterior surface of the zirconium alloy substrate.

4. The method of claim 1, further comprising:
    positioning the zirconium alloy substrate with the substantially uniform diffusion coating layer thereon in a nuclear reactor;
    exposing and contacting with water the zirconium alloy substrate with the substantially uniform diffusion coating layer thereon; and forming a protective oxide layer on the substantially uniform diffusion coating layer, which comprises one or more of the following $Cr_2O_3$, $SiO_2$, and $Al_2O_3$ when the one or more elements of the master alloy is chromium, silicon and aluminum, respectively.

5. The method of claim 1, wherein the diffusion coating layer comprises a Zr—Cr phase, a Zr—Si phase and a Zr—Al phase when the one or more elements of the master alloy is chromium, silicon and aluminum, respectively.

6. The method of claim 1, wherein the heating is conducted at a temperature from 600° C. to 1100° C.

7. The method of claim 1, wherein the substrate has a thickness from 1 micron to 200 microns.

8. The method of claim 7, wherein the coated zirconium alloy substrate is subjected to one or more cold working steps to reduce the overall thickness and achieve a final dimension.

9. The method of claim 8, wherein the cold working comprises pilgering.

10. The method of claim 8, further comprising intermediate annealing of the coated zirconium alloy substrate to release residual stress in the coating and cladding.

* * * * *